(12) United States Patent
Lin et al.

(10) Patent No.: US 8,159,817 B2
(45) Date of Patent: Apr. 17, 2012

(54) SLIDE RAIL MECHANISM AND HARD DISK DEVICE HAVING THE SLIDE RAIL MECHANISM

(75) Inventors: Yi-Jiun Lin, Taipei Hsien (TW); Kuan-Hsun Lu, Taipei Hsien (TW); Ta-Wei Chen, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 185 days.

(21) Appl. No.: 12/648,145

(22) Filed: Dec. 28, 2009

(65) Prior Publication Data

US 2011/0019357 A1   Jan. 27, 2011

(30) Foreign Application Priority Data

Jul. 24, 2009   (TW) ................................ 98213633 U

(51) Int. Cl.
*H05K 5/00* (2006.01)
*H05K 7/00* (2006.01)
*A47B 81/00* (2006.01)

(52) U.S. Cl. ......... 361/679.39; 361/679.33; 361/679.34; 361/679.35; 361/679.36; 361/679.37; 361/679.38; 312/223.1; 312/223.2

(58) Field of Classification Search .. 361/679.31–679.4, 361/679.55–679.6, 724–727; 439/60, 151–160, 439/327, 328, 331, 638; 312/223.1, 223.2; 211/26

See application file for complete search history.

(56) References Cited

U.S. PATENT DOCUMENTS

| 7,495,904 B2 * | 2/2009 | Liang et al. | 361/679.39 |
| 7,639,490 B2 * | 12/2009 | Qin et al. | 361/679.34 |

* cited by examiner

*Primary Examiner* — Robert J Hoffberg
*Assistant Examiner* — Jerry Wu
(74) *Attorney, Agent, or Firm* — Stephen A. Bent; Foley & Lardner LLP

(57) ABSTRACT

A hard disk device includes a hard disk having two opposite first sides, a second side interconnecting the first sides, and two corner portions defined by the first and second sides, and a slide rail mechanism including two first plates to be disposed slidably in a housing, and a second plate. Each first plate has a first section connected to the second plate, and a second section connected to the first section. The first section is spaced apart from the respective first side and is provided with a first support element for abutting against the corresponding corner portion. The second section abuts against the corresponding first side and is provided with positioning pins for engaging positioning holes in the corresponding first side. The second plate is spaced apart from the second side and is provided with second support elements for abutting against the second side.

16 Claims, 9 Drawing Sheets

SLIDE RAIL MECHANISM AND HARD DISK DEVICE HAVING THE SLIDE RAIL MECHANISM

CROSS-REFERENCE TO RELATED APPLICATION

This application claims priority of Taiwanese Application No. 098213633, filed on Jul. 24, 2009.

BACKGROUND OF THE INVENTION

1. Field of the Invention

The invention relates to a hard disk device with a slide rail mechanism, more particularly to a hard disk device having a hard disk connected firmly to a slide rail mechanism.

2. Description of the Related Art

Referring to FIGS. 1 and 2, a conventional hard disk device 80 having a slide rail mechanism can be mounted removably in a housing 3. The housing 3 has a pair of slide grooves 31 to correspond to each hard disk device 80, and the slide grooves 31 are respectively disposed on two opposite sides of the housing 3 and are each defined by two rails 32.

The hard disk device 80 includes a hard disk 8 and a slide rail mechanism 9. The hard disk 8 has two opposite first sides 81 and a second side 82 having two ends connected respectively to the first sides 81. Each of the first sides 81 is formed with two positioning holes 811, and an auxiliary positioning hole 812 disposed between the two positioning holes 811. The slide rail mechanism 9 is coupled removably to the hard disk 8, and includes two first plate members 91 and a second plate member 92. The two first plate members 91 extend respectively from two ends of the second plate member 92 in a same direction and in a spaced-apart relationship, and are disposed slidably and respectively in the slide grooves 31. Each of the first plate members 91 has a first section 911 connected to the second plate member 92, and a second section 912 connected to a free end of the first section 911. The first sections 911 are respectively spaced apart from the first sides 81. The second sections 912 respectively abut against the first sides 81, and are each provided with two positioning pins 93 that are insertable respectively into the positioning holes 811, and an auxiliary positioning element 94 that is insertable into the corresponding auxiliary positioning hole 812. The second plate member 92 is spaced apart from the second side 82.

When a user wants to remove the hard disk device 80 from the housing 3, the user can pull out the hard disk device 80 by pulling the second plate member 92. However, after removal of the hard disk device 80 from the housing 3, since the user may carry the hard disk device 80 by the second plate member 92, the up and down vibration of the hard disk device 80 may result in deformation of the second plate member 92 at a central portion thereof due to concentration of stress thereat, so that the central portion of the second plate member 92 is deformed inwardly or outwardly relative to the hard disk 8, which will be described in detail hereinbelow.

Referring to FIG. 3, if the central portion of the second plate member 92 is deformed outwardly relative to the hard disk 8, since there is a clearance between each of the positioning pins 93 and the respective positioning hole 811, deformation of the entire slide rail mechanism 9 such as that illustrated in FIG. 3 may result.

As shown in FIG. 3, free ends of the first plate members 91 flare outward in directions away from the respective first sides 81, so that the two positioning pins 93 farther from the second plate member 92 slip from the respective positioning holes 811 and the auxiliary positioning elements 94 slip from the respective auxiliary positioning holes 812. In addition, the two positioning pins 93 closer to the second plate member displace outward relative to the respective positioning holes 811. Thus, the coupling between the slide rail mechanism 9 and the hard disk 8 is unstable, and there is even the risk of the hard disk 8 disengaging from the slide rail mechanism 9 and falling to the ground.

Referring to FIG. 4, if the central portion of the second plate member 92 is deformed inwardly relative to the hard disk 8, since there is a clearance between each of the positioning pins 93 and the respective positioning hole 811, deformation of the entire slide rail mechanism 9 such as that illustrated in FIG. 4 will result.

As shown in FIG. 4, the free ends of the first plate members 91 flare outward in directions away from the respective first sides 81, so that the two positioning pins 93 farther from the second plate member 92 slip from the respective positioning holes 811 and the auxiliary positioning elements 94 displace outward relative to the respective auxiliary positioning holes 812. In addition, the two positioning pins 93 closer to the second plate member 92 also displace outward relative to the respective positioning holes 811. Thus, the coupling between the slide rail mechanism 9 and the hard disk 8 is unstable, and there is even the risk of the hard disk 8 disengaging from the slide rail mechanism 9 and falling to the ground.

It can be appreciated from the above that the coupling between the hard disk 8 and the slide rail mechanism 9 will become unstable if the central portion of the second plate member 92 is deformed inwardly or outwardly relative to the hard disk 8 due to concentration of stress thereat. Thus, there is room for improvement.

SUMMARY OF THE INVENTION

Therefore, an object of the present invention is to provide a hard disk device which includes a hard disk and a slide rail mechanism that can be connected firmly to the hard disk.

Another object of the present invention is to provide a slide rail mechanism which can be connected firmly to a hard disk.

Accordingly, the hard disk device of the present invention is mountable removably in a housing which has two opposite sides that are each provided with a slide groove. The hard disk device includes a hard disk and a slide rail mechanism.

The hard disk has two opposite first sides, a second side having two ends connected respectively to the first sides, and two corner portions cooperatively defined by the first sides and the second side. Each of the first sides is formed with two positioning holes. The slide rail mechanism is connected removably to the hard disk, and includes two first plate members and a second plate member. The first plate members extend respectively from two ends of the second plate member in a same direction and in a spaced-apart relationship to be disposed slidably and respectively in the slide grooves. Each of the first plate members has a first section connected to the second plate member, and a second section connected to a free end of the first section. The first section is spaced apart from a respective one of the first sides and is provided with a first support element for abutting against a respective one of the corner portions. The second section abuts against a respective one of the first sides and is provided with two positioning pins that are to be inserted respectively into the positioning holes. The second plate member is spaced apart from the second side and is provided with two second support elements for abutting against the second side.

Preferably, the first support element extends inclinedly toward the second plate member.

Preferably, the first support element is configured to be rounded at a portion where the first support element abuts against the respective one of the corner portions.

Preferably, the two second support elements extend inclinedly toward each other.

Preferably, each of the second support elements is configured to be rounded at a portion where the respective one of the second support elements abuts against the second side.

Preferably, the second section of each of the first plate members is formed with two engaging holes for extension of the positioning pins therethrough.

Preferably, each of the positioning pins has an engaging portion to be received fittingly in a respective one of the engaging holes, and an insert portion connected to the engaging portion and insertable into the respective one of the positioning holes.

Preferably, each of the first sides is formed with an auxiliary positioning hole. The second section of each of the first plate members is further provided with an auxiliary positioning element for insertion into the auxiliary positioning hole of a respective one of the first sides.

Preferably, the auxiliary positioning element has a forked free end.

Preferably, the two first plate members, the second plate member, the two first support elements, and the two second support elements are integrally formed and are made of a plastic material.

The advantageous effect of this invention resides in that, by virtue of the arrangement of the first support elements on the first plate members to respectively abut against the corner portions, and by virtue of the arrangement of the second support elements on the second plate member to abut against the second side, the inter-engagement between the slide rail mechanism and the hard disk remains firm even when a central portion of the second plate member is deformed inwardly or outwardly relative to the hard disk due to concentration of stress thereat.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
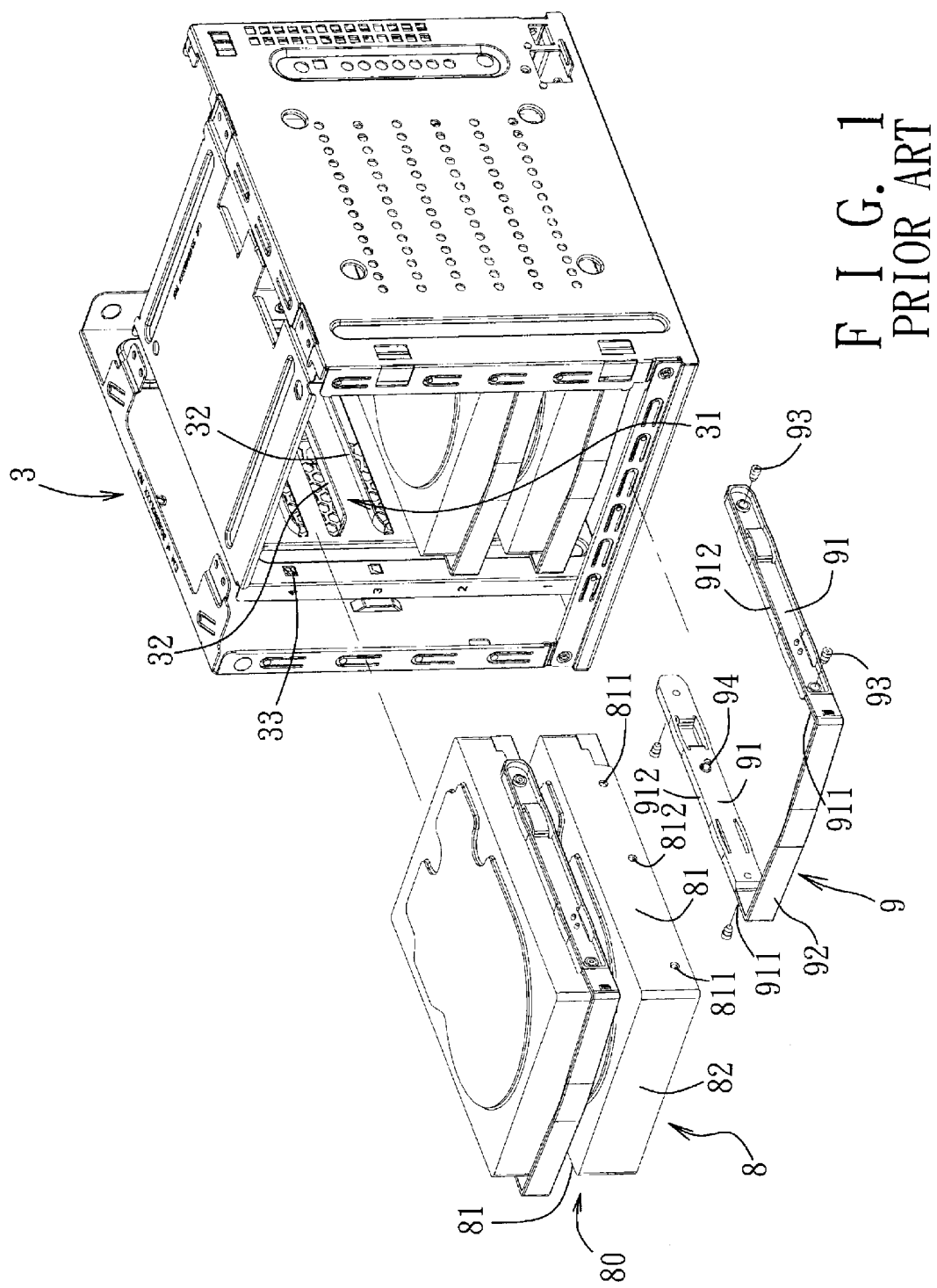
FIG. 1 is an exploded perspective view of a conventional hard disk device having a slide rail mechanism, and a housing.
Figure 2:
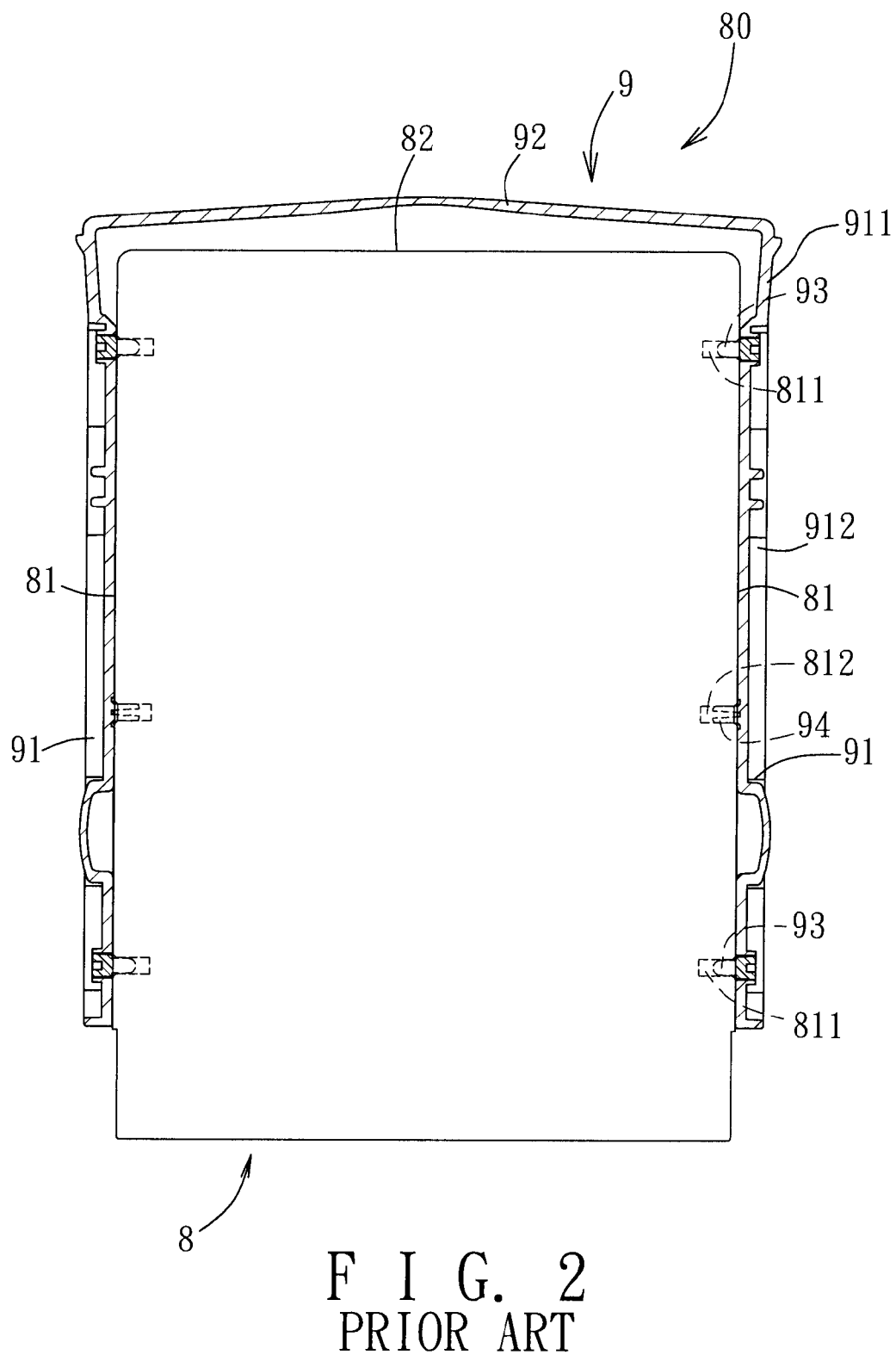
FIG. 2 is a schematic sectional view of the conventional hard disk device having a slide rail mechanism.
Figure 3:
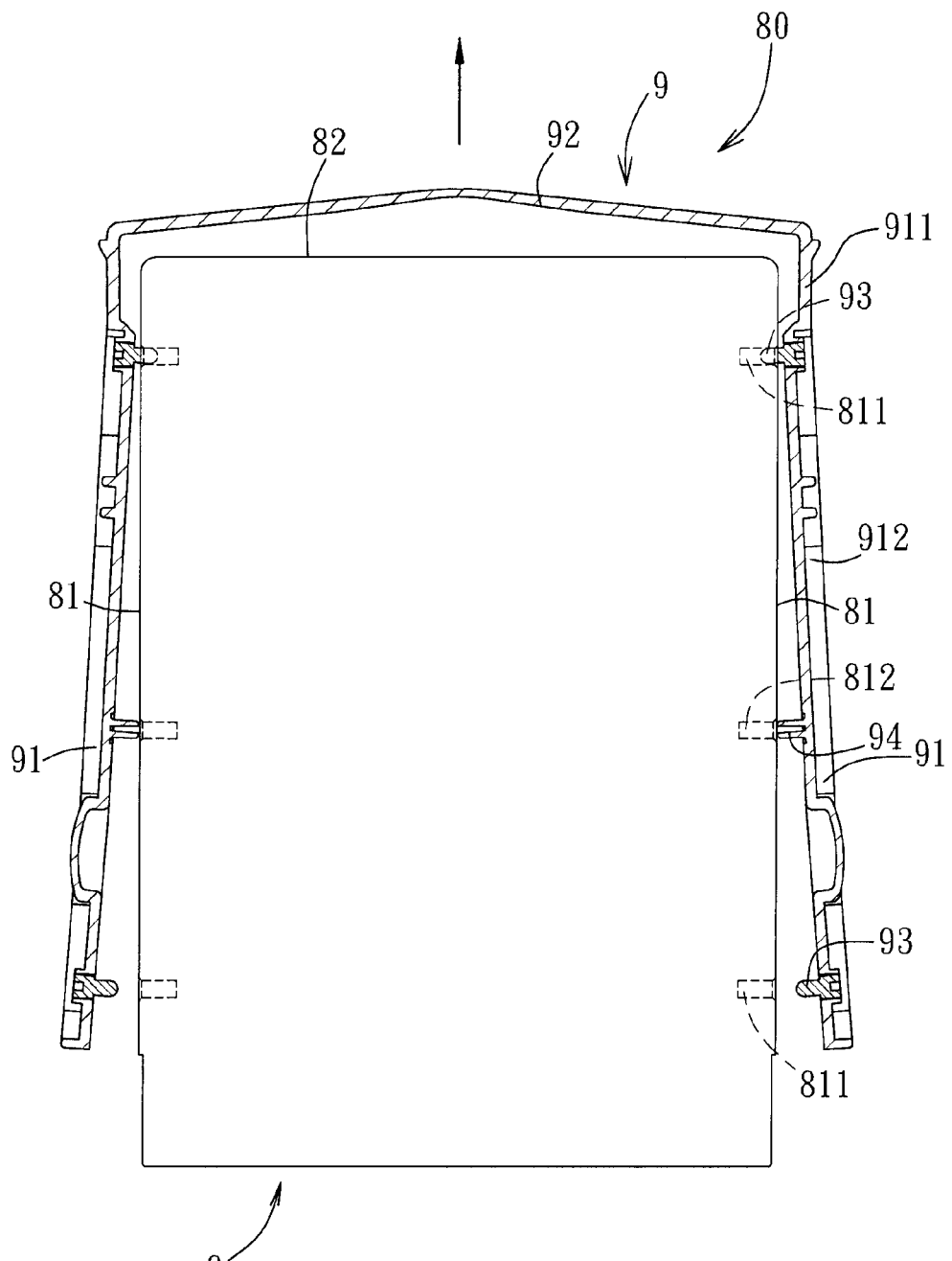
FIG. 3 is a view similar to FIG. 2, illustrating how a central portion of a second plate member of the slide rail mechanism is deformed outwardly relative to a hard disk.
Figure 4:
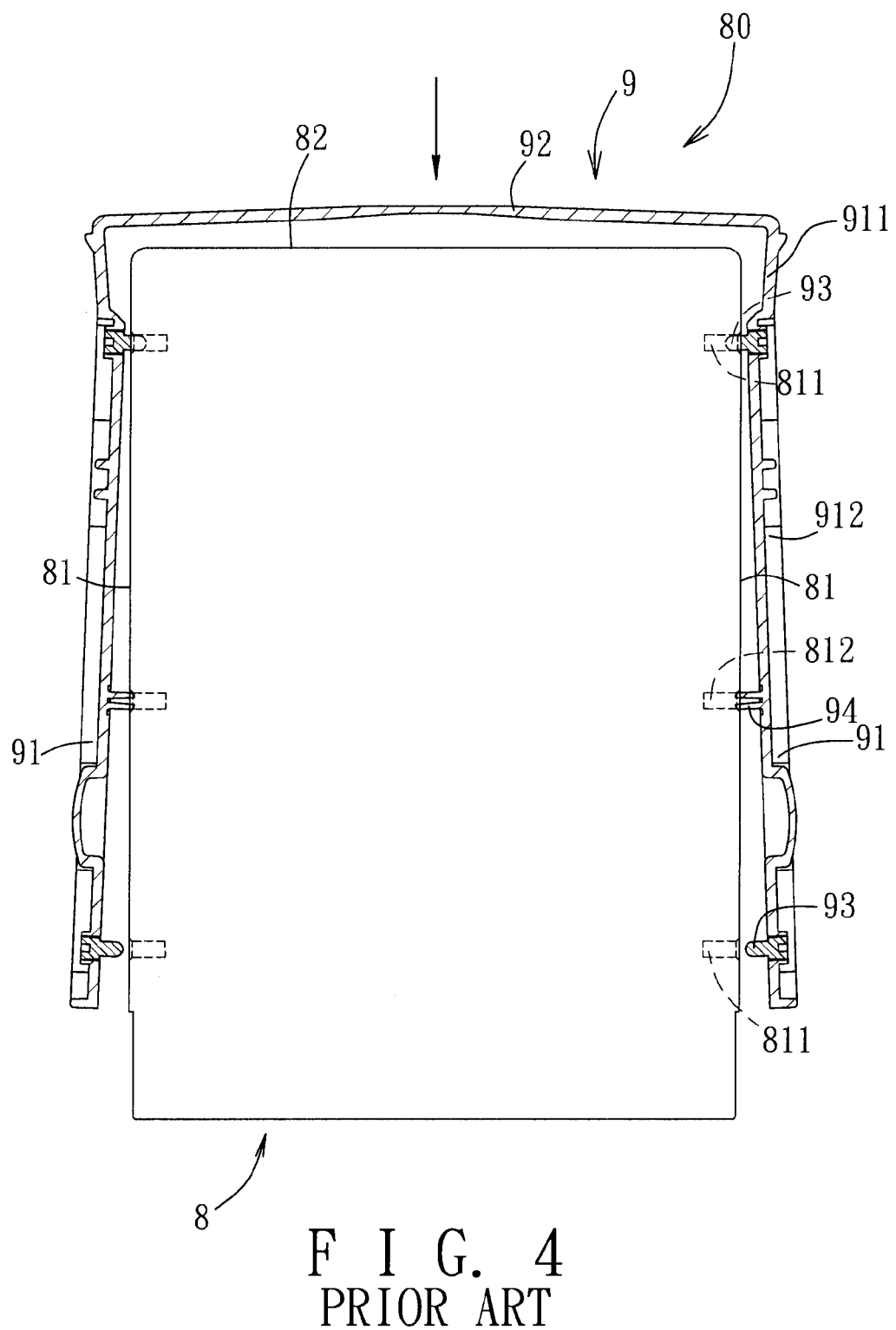
FIG. 4 is a view similar to FIG. 2, illustrating how the central portion of the second plate member of the slide rail mechanism is deformed inwardly relative to the hard disk.
Figure 5:
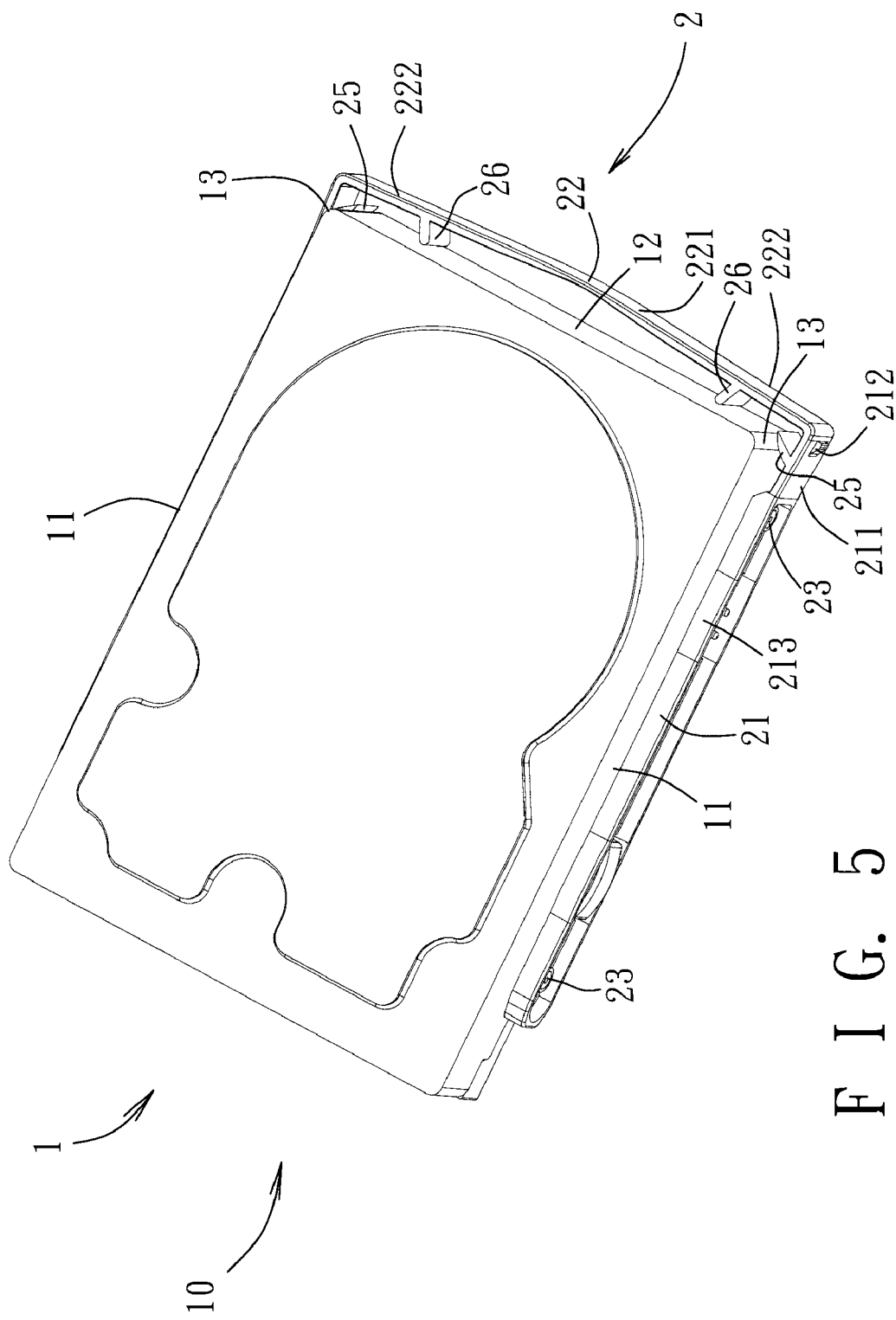
FIG. 5 is a perspective view of the preferred embodiment of a hard disk device having a slide rail mechanism according to the present invention.
Figure 6:
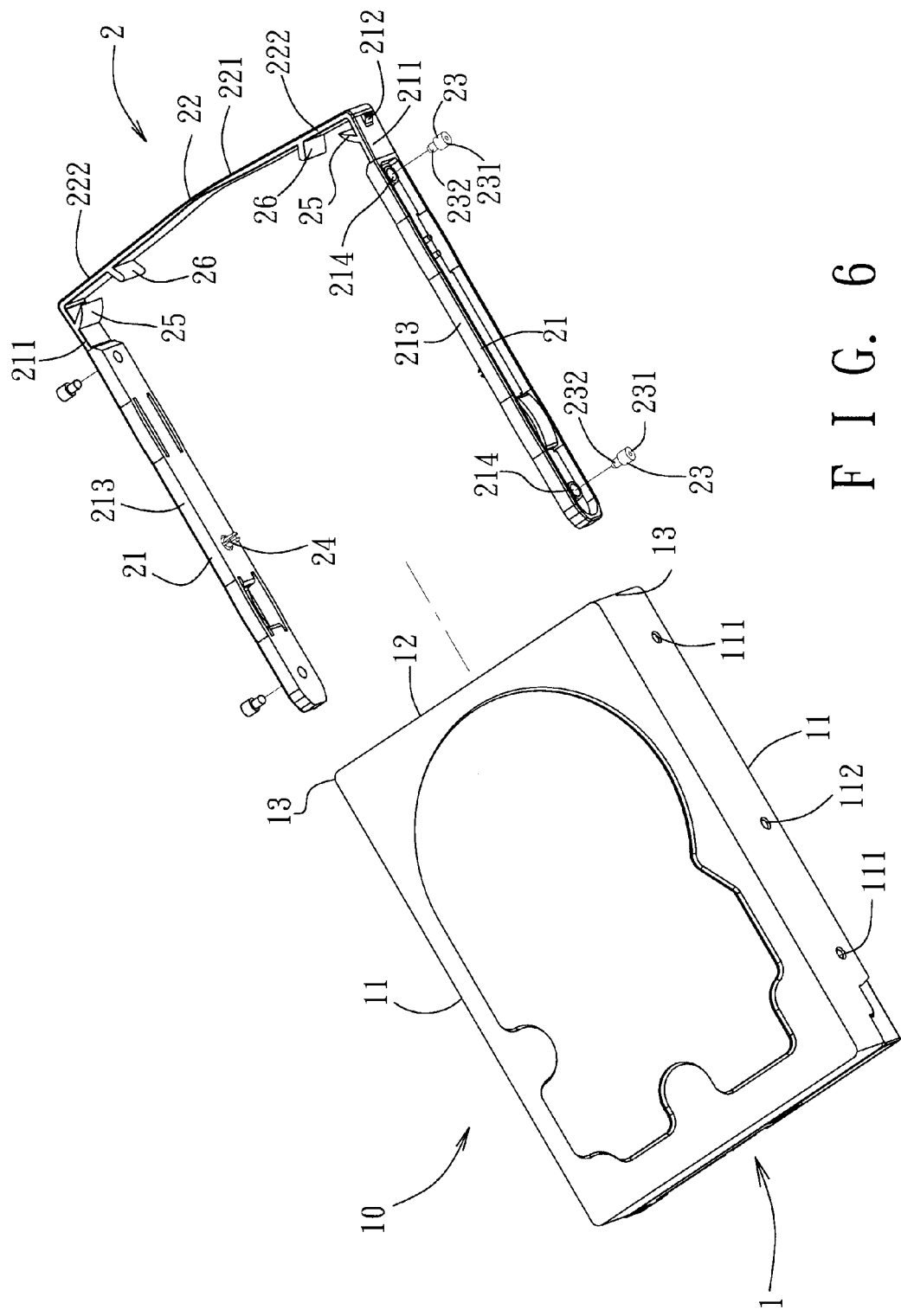
FIG. 6 is an exploded perspective view of the preferred embodiment.
Figure 7:
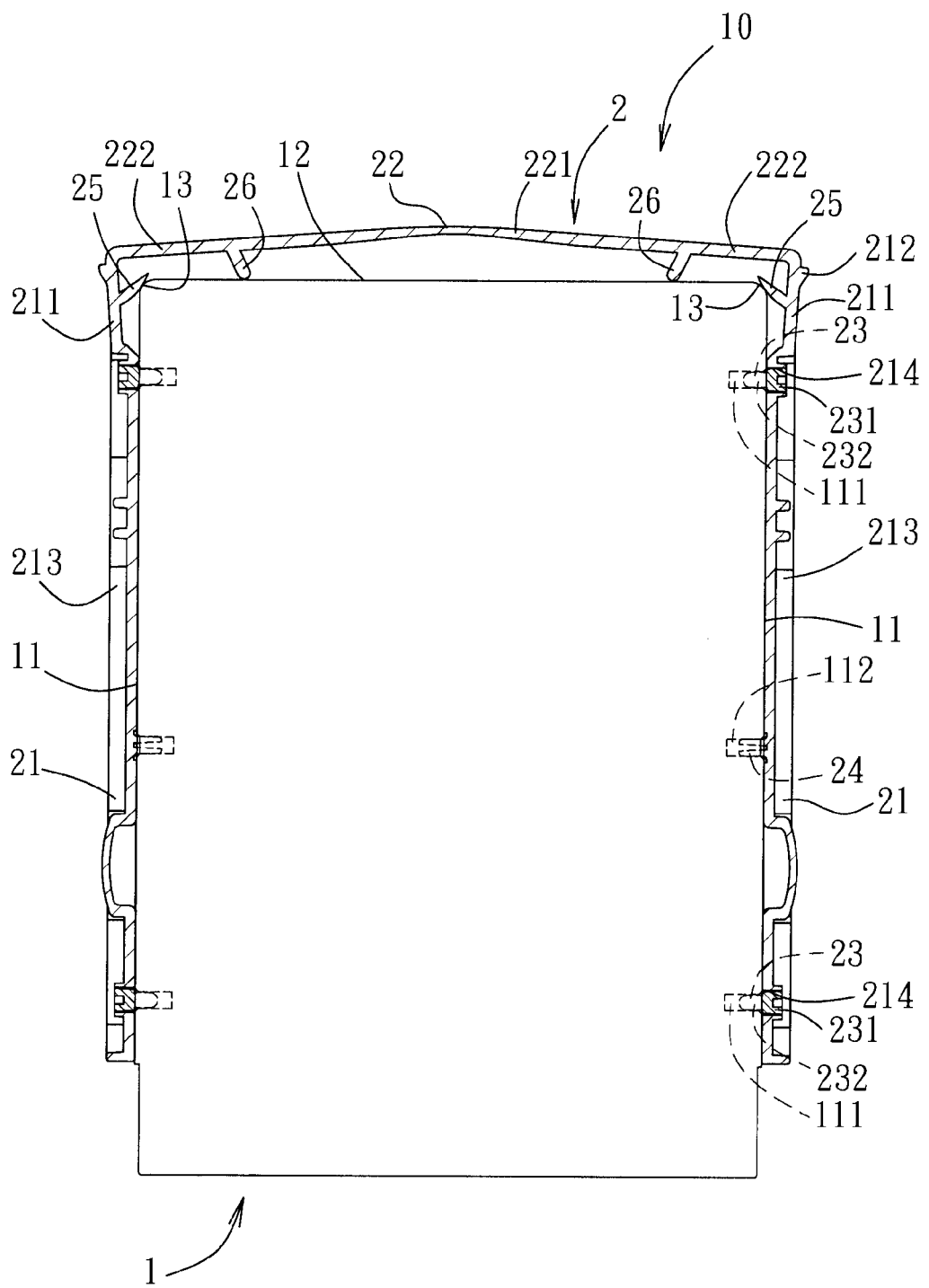
FIG. 7 is a schematic sectional view of the preferred embodiment.

Referring to FIGS. 5, 6 and 7, the preferred embodiment of a hard disk device 10 according to the present invention is disposed to be mounted removably in a housing 3 as shown in FIG. 1. As described hereinbefore, the housing 3 has a pair of slide grooves 31 to correspond to the hard disk device 10, and the slide grooves 31 are respectively disposed on two opposite sides of the housing 3 and are each defined by two rails 32. Moreover, an engaging slot 33 is provided at an opening of each of the slide grooves 31.

The hard disk device 10 includes a hard disk 1 and a slide rail mechanism 2. The hard disk 1 has two opposite first sides 11, a second side 12 having two ends connected respectively to the first sides 11, and two corner portions 13 cooperatively defined by the first sides 11 and the second side 12. Each of the corner portions 13 has an arcuate shape. Each of the first sides 11 is formed with two positioning holes 111, and an auxiliary positioning hole 112 disposed between the positioning holes 111.

The slide rail mechanism 2 is connected removably to the hard disk 1 and is substantially U-shaped. The slide rail mechanism 2 includes two first plate members 21 and a second plate member 22. The two first plate members 21 extend respectively from two ends of the second plate member 22 in a same direction and in a spaced-apart relationship to be disposed respectively and slidably in the slide grooves 31 of the housing 3.

Each of the first plate members 21 has a first section 211 connected to the second plate member 22, and a second section 213 connected to a free end of the first section 211. The first section 211 has a thickness smaller than that of the second section 213.

Each of the first sections 211 of the first plate members 21 is spaced apart from a respective one of the first sides 11 of the hard disk 1, and is provided with a first support element 25 on an inner side thereof for abutting against a respective one of the corner portions 13, and an engaging block 212 on an outer side thereof for engaging a respective one of the engaging slots 33 in the housing 3. When the hard disk device 10 is mounted in the housing 3, the inter-engagement between the engaging blocks 212 and the engaging slots 33 can prevent the hard disk device 10 from slipping out of the housing 3.

Each of the second sections 213 of the first plate members 21 abuts against a respective one of the first sides 11, and is provided with two positioning pins 23 that are disposed to be inserted respectively into the positioning holes 111 in the respective one of the first sides 11, and an auxiliary positioning element 24 that is disposed to be inserted into the auxiliary positioning hole 112 in the respective one of the first sides 11.

The second plate member 22 is spaced apart from the second side 12, and is provided with two second support elements 26 on an inner side thereof for abutting against the second side 12. The second plate member 22 has a third section 221 disposed between the second support elements 26, and two fourth sections 222 that are connected respectively to two opposite ends of the third section 221 and that are connected respectively to the first plate members 21.

It should be noted herein that the second plate member 22 is slightly curved, i.e., a distance between a central portion of the second plate member 22 and the second side 12 is larger than that between each of two ends of the second plate member 22 and the second side 12 so as to facilitate gripping by a user. In addition, the first plate members 21, the second plate member 22, the auxiliary positioning elements 24, the first support elements 25, and the second support elements 26 are integrally formed and are made of a plastic material.

In this embodiment, each of the first support elements 25 extends inclinedly toward the second plate member 22, and is configured to be rounded at a portion where it abuts against the respective corner portion 13. The two second support elements 26 extend inclinedly toward each other, and each of the second support elements 26 is configured to be rounded at a portion where it abuts against the second side 12. The functions of the first support elements 25 and the second support elements 26 will be described in detail hereinafter.

In addition, in this embodiment, the second section 213 of each of the first plate members 21 is formed with two engaging holes 214 for extension of the positioning pins 23 respectively therethrough. Each of the positioning pins 23 has an engaging portion 231 to be received fittingly in a respective one of the engaging holes 214, and an insert portion 232 connected to the engaging portion 231 for insertion into a respective one of the positioning holes 111. The insert portions 232 have an outer diameter smaller than that of the engaging portions 231, and there is a surrounding clearance between each of the insert portions 232 and the respective one of the positioning holes 111. Moreover, each of the auxiliary positioning elements 24 has a forked free end.

Through the configuration of the slide rail mechanism 2, after the slide rail mechanism 2 is coupled to the hard disk 1, the hard disk device 10 can be mounted removably in the housing 3 by means of the first plate members 21 that are slidable along the slide grooves 31, respectively.

When the user wants to remove the hard disk device 10 from the housing 3, the hard disk device 10 can be removed by pulling the second plate member 22. However, after removal of the hard disk device 10 from the housing 3, since the user may carry the hard disk device 10 by the second plate member 22, deformation may occur at the third section 221 of the second plate member 22 due to concentration of stress thereat as a result of the up and down vibration of the hard disk device 10, so that the central portion of the second plate member 22 may bend toward or away from the hard disk 1, which will be described in detail hereinbelow.

Figure 8:
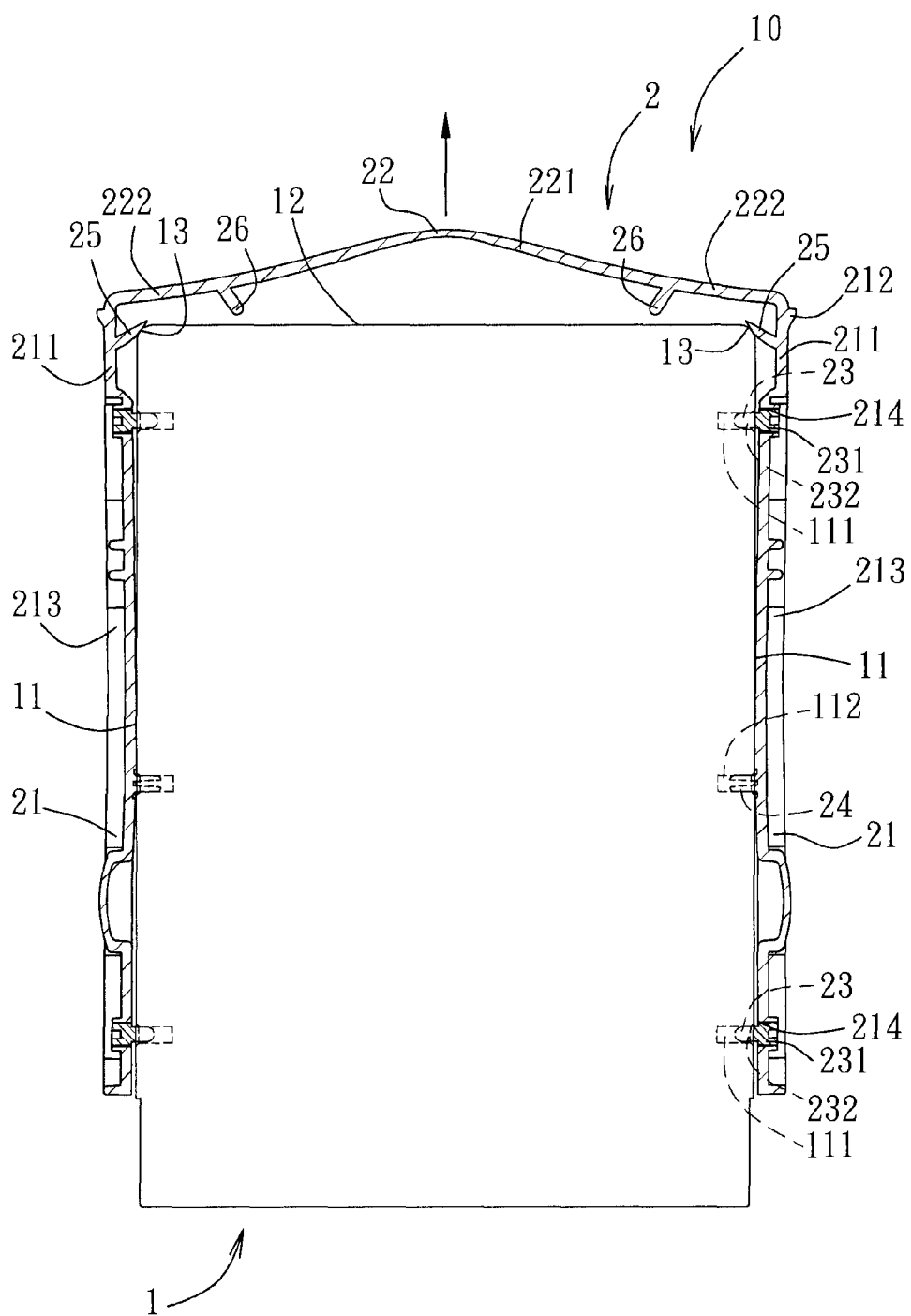
FIG. 8 is a view similar to FIG. 7, illustrating how a third section of a second plate member of the slide rail mechanism is deformed outwardly relative to a hard disk.

Referring to FIG. 8, if the third section 221 of the second plate member 22 is deformed outwardly relative to the hard disk 1, the entire slide rail mechanism 2 will be deformed in such a way as that shown in FIG. 8.

As shown in FIG. 8, the two second support elements 26 no longer abut against the second side 12, so that the first sections 211 of the first plate members 21 are closer to the respective first sides 11, and the first support elements 25 are displaced slightly relative to the respective corner portions 13. Since the first support elements 25 respectively abut against the corner portions 13 to provide support for the first sections 211, displacement of the first sections 211 toward the respective first sides 11 is checked, thereby reducing the extent of deformation of the first plate members 21.

Therefore, although there is a clearance between the insert portion 232 of each of the positioning pins 23 and the respective positioning hole 111, each of the two positioning pins 23 of the first plate members 21 is displaced outward merely slightly relative to the respective positioning hole 111, and the auxiliary positioning elements 24 remain in full engagement with the respective auxiliary positioning holes 112. Hence, the inter-engagement between the slide rail mechanism 2 and the hard disk 1 is still quite firm.

It is worth mentioning that configuring the first support elements 25 to be rounded at where they abut against the respective corner portions 13 renders the slidable displacement of the first support elements 25 relative to the respective corner portions 13 smoother.

Figure 9:
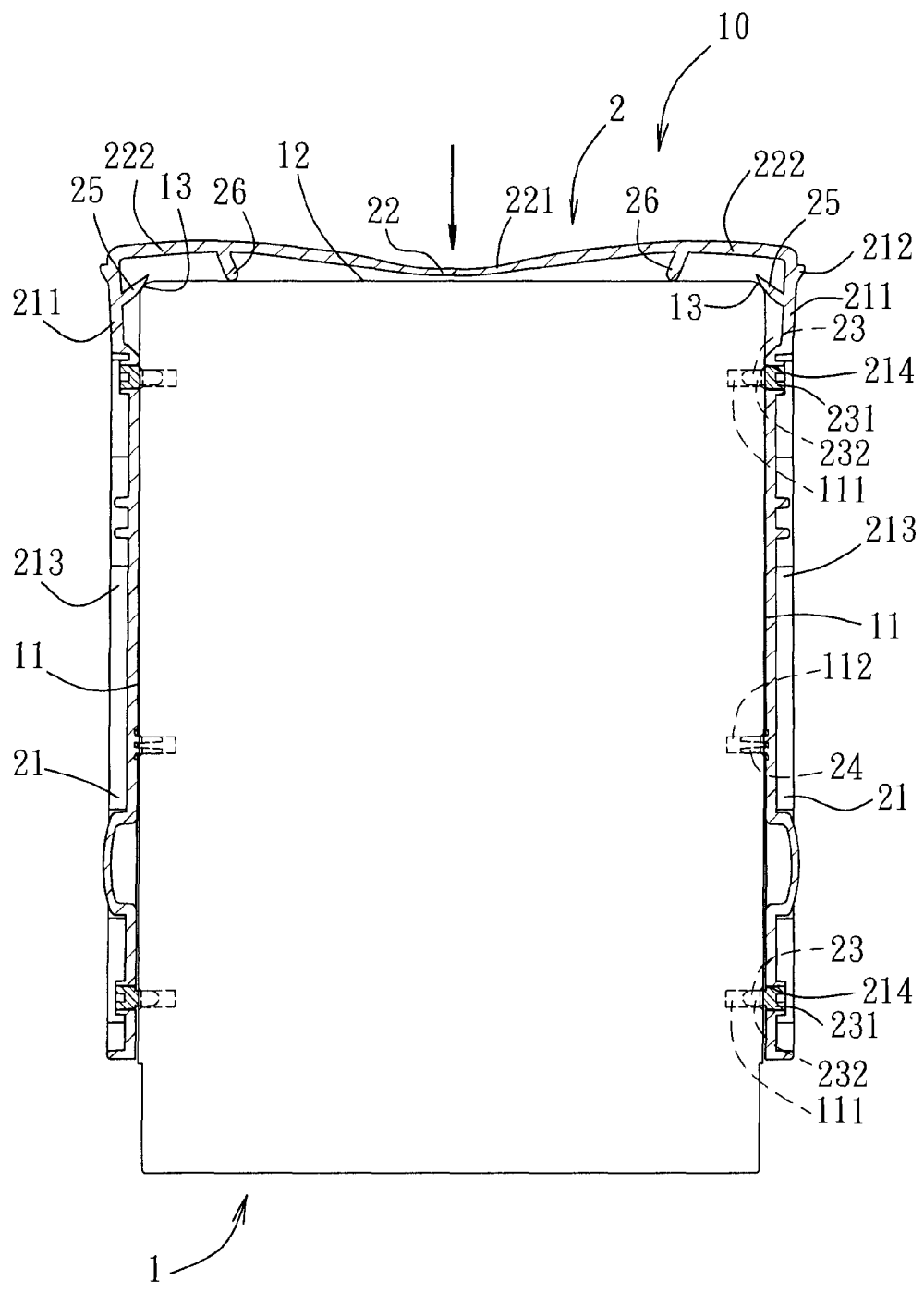
FIG. 9 is a view similar to FIG. 7, illustrating how the third section of the second plate member of the slide rail mechanism is deformed inwardly relative to the hard disk.

Referring to FIG. 9, if the third section 221 of the second plate member 22 is deformed inwardly relative to the hard disk 1, the entire slide rail mechanism 2 will be deformed in such a way as that shown in FIG. 9.

As shown in FIG. 9, the two second support elements 26 respectively abut against the second side 12 to provide support for the second plate member 22, and the two second support elements 26 are displaced slightly relative to the second side 12. Since the two second support elements 26 abut against the second side 12 to provide support, the deformation of the second plate member 22 is mainly focused on the third section 221 between the two second support elements 26, the fourth sections 222 connected to the ends of the third section 221 are only slightly deformed, and the first plate members 21 are also only slightly deformed.

Therefore, although there is a clearance between the insert portion 232 of each of the positioning pins 23 and the respective positioning hole 111, the two positioning pins 23 farther from the second plate member 22 are displaced outward merely slightly relative to the respective positioning holes 111, the auxiliary positioning elements 24 remain in full engagement with the respective auxiliary positioning holes 112, and the two positioning pins 23 closer to the second plate member 22 also remain in full engagement with the respective positioning holes 111. Hence, the inter-engagement between the slide rail mechanism 2 and the hard disk 1 is still quite firm.

It is worth mentioning that configuring the second support elements 26 to be rounded at where they abut against the second side 12 renders the sliding displacement of the second support elements 26 relative to the second side 12 smoother.

It can be appreciated from the foregoing that whether the third section 221 of the second plate member 22 is deformed inwardly or outwardly relative to the hard disk 1 due to concentration of stress thereat, the inter-engagement between the slide rail mechanism 2 and the hard disk 1 remains firm.

In summary, by virtue of the arrangement of the first support elements 25 on the first plate members 21 to respectively abut against the corner portions 13, and by virtue of the arrangement of the second support elements 26 on the second plate member 22 to abut against the second side 12, the inter-engagement between the slide rail mechanism 2 and the hard disk 1 remains firm even when the third section 221 of the second plate member 22 is deformed inwardly or outwardly relative to the hard disk 1 due to concentration of stress at the third section 221.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A hard disk device mountable removably in a housing, the housing having two opposite sides which are respectively provided with slide grooves, said hard disk device comprising:
   a hard disk having two opposite first sides, a second side having two ends connected respectively to said first sides, and two corner portions cooperatively defined by said first sides and said second side, each of said first sides being formed with two positioning holes; and a slide rail mechanism connected removably to said hard disk, and including two first plate members and a second plate member, said first plate members extending respectively from two ends of said second plate member in a same direction and in a spaced-apart relationship to be disposed slidably and respectively in the slide grooves, each of said first plate members having a first section connected to said second plate member, and a second section connected to a free end of said first section, said first section being spaced apart from a respective one of said first sides and being provided with a first support element that extends inclinedly from said first section toward said second plate member and that abuts against a respective one of said corner portions, said second section abutting against a respective one of said first sides and being provided with two positioning pins that are to be inserted respectively into said positioning holes, said second plate member being spaced apart from said second side and being provided with two second support elements that extend inclinedly from said second plate member toward each other and that abut against said second side.

2. The hard disk device of claim 1, wherein said first support element is configured to be rounded at a portion where said first support element abuts against the respective one of said corner portions.

3. The hard disk device of claim 1, wherein each of said second support elements is configured to be rounded at a portion where a respective one of said second support elements abuts against said second side.

4. The hard disk device of claim 1, wherein said second section of each of said first plate members is formed with two engaging holes for extension of said positioning pins therethrough.

5. The hard disk device of claim 4, wherein each of said positioning pins has an engaging portion to be received fittingly in a respective one of said engaging holes, and an insert portion connected to said engaging portion and insertable into the respective one of said positioning holes.

6. The hard disk device of claim 1, wherein each of said first sides is formed with an auxiliary positioning hole, said second section of each of said first plate members being further provided with an auxiliary positioning element for insertion into said auxiliary positioning hole of a respective one of said first sides.

7. The hard disk device of claim 6, wherein said auxiliary positioning element has a forked free end.

8. The hard disk device of claim 1, wherein said two first plate members, said second plate member, said two first support elements, and said two second support elements are integrally formed and are made of a plastic material.

9. A slide rail mechanism connectible removably to a hard disk so as to permit the hard disk to be mounted removably in a housing, the housing having two opposite sides which are respectively provided with slide grooves, the hard disk having two opposite first sides, a second side having two ends connected respectively to the first sides, and two corner portions cooperatively defined by the first sides and the second side, each of the first sides being formed with two positioning holes, said slide rail mechanism comprising two first plate members and a second plate member, said first plate members extending respectively from two ends of said second plate member in a same direction and in a spaced-apart relationship to be disposed slidably and respectively in the slide grooves, each of said first plate members having a first section connected to said second plate member, and a second section connected to a free end of said first section, said first section being disposed to be spaced apart from a respective one of the first sides and being provided with a first support element that extends inclinedly from said first section toward said second plate member and that abuts against a respective one of the corner portions, said second section being disposed to abut against a respective one of the first sides and being provided with two positioning pins that are to be inserted respectively into the positioning holes, said second plate member being disposed to be spaced apart from the second side and being provided with two second support elements that extend inclinedly from said second plate member toward each other and that abut against the second side.

10. The slide rail mechanism of claim 9, wherein said first support element is configured to be rounded at a portion where said first support element is disposed to abut against the respective one of the corner portions.

11. The slide rail mechanism of claim 9, wherein each of said second support elements is configured to be rounded at a portion where a respective one of said second support elements is disposed to abut against the second side.

12. The slide rail mechanism of claim 9, wherein said second section of each of said first plate members is formed with two engaging holes for extension of said positioning pins therethrough.

13. The slide rail mechanism of claim 12, wherein each of said positioning pins has an engaging portion to be received fittingly in a respective one of said engaging holes, and an insert portion connected to said engaging portion and insertable into the respective one of the positioning holes.

14. The slide rail mechanism of claim 9, each of the first sides being formed with an auxiliary positioning hole, wherein said second section of each of said first plate members is further provided with an auxiliary positioning element for insertion into the auxiliary positioning hole of a respective one of the first sides.

15. The slide rail mechanism of claim 14, wherein said auxiliary positioning element has a forked free end.

16. The slide rail mechanism of claim 9, wherein said two first plate members, said second plate member, said two first support elements, and said two second support elements are integrally formed and are made of a plastic material.

* * * * *